United States Patent
Kohlstrung et al.

(10) Patent No.: US 11,441,004 B2
(45) Date of Patent: Sep. 13, 2022

(54) THERMALLY EXPANDABLE COMPOSITIONS COMPRISING POLYSACCHARIDE

(71) Applicant: Henkel AG & Co. KGaA, Duesseldorf (DE)

(72) Inventors: Rainer Kohlstrung, Plankstadt (DE); Klaus Rappmann, Weinheim-Rittenweier (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 454 days.

(21) Appl. No.: 15/935,214

(22) Filed: Mar. 26, 2018

(65) Prior Publication Data

US 2018/0215887 A1    Aug. 2, 2018

Related U.S. Application Data

(63) Continuation of application No. PCT/EP2016/073067, filed on Sep. 28, 2016.

(30) Foreign Application Priority Data

Sep. 28, 2015    (EP) .................................... 15187177

(51) Int. Cl.
| | |
|---|---|
| *B29C 44/18* | (2006.01) |
| *C08J 9/00* | (2006.01) |
| *C08J 9/08* | (2006.01) |
| *C08L 23/08* | (2006.01) |
| *B29C 44/34* | (2006.01) |
| *C09K 3/10* | (2006.01) |
| *C08L 3/02* | (2006.01) |
| *C08F 220/18* | (2006.01) |
| *B29K 1/00* | (2006.01) |
| *B29K 23/00* | (2006.01) |
| *B29K 105/04* | (2006.01) |
| *B29K 105/00* | (2006.01) |
| *B29L 31/30* | (2006.01) |

(52) U.S. Cl.
CPC .......... *C08J 9/0061* (2013.01); *B29C 44/188* (2013.01); *B29C 44/3415* (2013.01); *C08J 9/0023* (2013.01); *C08J 9/08* (2013.01); *C08L 23/08* (2013.01); *C08L 23/0853* (2013.01); *C09K 3/10* (2013.01); *B29K 2001/00* (2013.01); *B29K 2023/083* (2013.01); *B29K 2105/04* (2013.01); *B29K 2105/253* (2013.01); *B29K 2995/0002* (2013.01); *B29K 2995/0069* (2013.01); *B29L 2031/30* (2013.01); *C08F 220/1804* (2020.02); *C08J 2201/026* (2013.01); *C08J 2203/02* (2013.01); *C08J 2207/00* (2013.01); *C08J 2323/08* (2013.01); *C08J 2353/02* (2013.01); *C08J 2401/00* (2013.01); *C08J 2401/02* (2013.01); *C08J 2403/00* (2013.01); *C08J 2403/02* (2013.01); *C08J 2405/00* (2013.01); *C08J 2423/08* (2013.01); *C08L 3/02* (2013.01); *C08L 2203/14* (2013.01); *C08L 2310/00* (2013.01); *C09K 2003/1059* (2013.01); *C09K 2003/1068* (2013.01); *C09K 2200/0622* (2013.01)

(58) Field of Classification Search
CPC .......................... B29C 44/188; B29C 44/3415
USPC ....................................................... 264/267
See application file for complete search history.

(56) References Cited

U.S. PATENT DOCUMENTS

| | | | |
|---|---|---|---|
| 3,798,188 A | 3/1974 | Takizawa et al. | |
| 4,692,427 A | 9/1987 | Pastornio et al. | |
| 9,637,067 B2 | 5/2017 | Kohlstrung et al. | |
| 2008/0265516 A1 | 10/2008 | Walker et al. | |
| 2009/0239962 A1* | 9/2009 | Dobashi | C08J 9/06 521/95 |
| 2013/0078445 A1 | 3/2013 | Ramesh et al. | |
| 2014/0020910 A1 | 1/2014 | Falkner et al. | |
| 2014/0131910 A1 | 5/2014 | Kohlstrung et al. | |
| 2017/0002164 A1 | 1/2017 | Kohlstrung et al. | |

FOREIGN PATENT DOCUMENTS

| | | |
|---|---|---|
| CN | 102532647 A | 7/2012 |
| CN | 103205124 A | 7/2013 |
| CN | 103756111 A | 4/2014 |
| DE | 2018536 B2 | 7/1976 |
| DE | 102012221192 A1 | 5/2014 |
| GB | 1346676 A | 2/1974 |
| JP | S5898341 A | 6/1983 |
| JP | 63150335 A | 6/1988 |
| JP | H11286570 A | 10/1999 |
| JP | 2000143862 A | 5/2000 |

(Continued)

OTHER PUBLICATIONS

English abstract of CN102226015A (Year: 2011).*
M. A. Rodriguez-Perez et al, "Foaming of EVA/Starch Blends: Characterization of the Structure, Physical Properties, and Biodegradability", Polymer Engineering and Science, Bd. 52, Nr. 1, 15., Jul. 15, 2015, pp. 62-70, XP055244916, US. ISSN: 0032-3888, DOI: 10.1002/pen.22046 das ganze Dokument.

(Continued)

*Primary Examiner* — Jeffrey M Wollschlager
*Assistant Examiner* — Xue H Liu
(74) *Attorney, Agent, or Firm* — Mary K. Cameron

(57) ABSTRACT

The present application relates to a thermally expandable composition containing at least one peroxide cross-linking polymer, at least one peroxide, at least one polysaccharide and at least one endothermic, chemical blowing agent; as well as to shaped bodies containing said composition and to a method for sealing and filling voids in components, for strengthening or reinforcing components, in particular hollow components, and for bonding mobile components using shaped bodies of this type.

24 Claims, No Drawings

(56) References Cited

FOREIGN PATENT DOCUMENTS

| | | | |
|---|---|---|---|
| JP | 2002317067 A | 10/2002 | |
| JP | 2002322306 A | 11/2002 | |
| JP | 2003012644 A | 1/2003 | |
| JP | 2008162022 A | 7/2008 | |
| JP | 2008208341 A | 9/2008 | |
| JP | 2010047709 A | 3/2010 | |
| JP | 2010513604 A | 4/2010 | |
| WO | 2007039309 A1 | 4/2007 | |
| WO | 2008021200 A1 | 2/2008 | |
| WO | 2008034755 A1 | 3/2008 | |
| WO | 2013017536 A1 | 2/2013 | |
| WO | 2014060205 A1 | 4/2014 | |
| WO | 2015140282 A1 | 9/2015 | |
| WO | 2016058887 A1 | 4/2016 | |

OTHER PUBLICATIONS

International Search Report for PCT/EP2016/073067, dated Dec. 1, 2016. All references cited in the International Search Report are listed herein.

International Search Report for PCT/EP2016/073065, dated Nov. 4, 2016. All references cited in the International Search Report are listed herein.

Hitoshi Kondo, "The Characteristic of Foaming Agents", Journal of The Society of Rubber Industry, Japan, The Society of Rubber Science and Technology, Japan, Oct. 31, 2001, vol. 74, No. 10. p. 58-63.

* cited by examiner

THERMALLY EXPANDABLE COMPOSITIONS COMPRISING POLYSACCHARIDE

The present application relates to a thermally expandable composition containing at least one peroxidically crosslinking polymer, at least one peroxide and at least one endothermic chemical blowing agent, to shaped bodies containing said composition, and to a method for sealing and filling cavities in components, for strengthening or stiffening components, in particular hollow components, and for bonding movable components, using shaped bodies of this kind.

Modern vehicles and vehicle parts have a plurality of cavities which have to be sealed in order to prevent moisture and dirt from entering, since moisture and dirt can lead to the corresponding body parts corroding from within. This applies in particular to modern self-supporting body constructions in which a heavy frame construction is replaced by a lightweight, structurally rigid framework consisting of prefabricated cavity profiles. Constructions of this kind have a number of cavities, depending on the system, which have to be sealed against the ingress of moisture and dirt. Seals of this kind are also used to prevent the transmission of airborne sound and structural sound in cavities of this kind, and to thus reduce levels of unpleasant noise generated by the vehicle moving and by the wind and thus increase travel comfort in the vehicle.

Baffle parts which have a sealing and/or acoustic effect in cavities of this kind are often referred to as "cavity sealing systems", "pillar fillers", "baffles" or "acoustic baffles". Generally, said parts consist either completely of thermally expandable shaped bodies or of shaped bodies which contain a carrier and polymer compositions that can expand in the periphery region thereof. Said baffle parts are fastened to the open structures in the shell by being hung, clipped, screwed or welded thereon. After the structures have been closed in the shell and after the vehicle body has undergone further preliminary treatments, the process heat of the furnace for curing the cathodic dip paint is then utilized so as to cause the expandable part of the baffle part to expand in order to thus seal the cross section of the cavity.

In modern vehicles, there is also an increasing need for lightweight components which are based on metal and/or plastic material, are intended for dimensionally consistent batch production and have a specified rigidity and structural strength. In particular in vehicle construction, given the desire to reduce weight, there is a need for metal lightweight components consisting of thin-walled sheets which nevertheless have sufficient rigidity and structural strength. Here too, shaped bodies are used that consist of thermally expandable compositions which provide the required support properties.

Appropriate thermally expandable compositions are described, for example, in WO 2008/034755, WO 2007/039309, WO 2013/017536 and the German application DE 10 2012 221 192.6. These thermally expandable compositions are also used in the automotive sector.

Exothermic blowing agents, such as ADCA (azodicarbonamide), OBSH (4,4'-oxybis(benzenesulfonyl hydrazide)), DNPT (dinitroso pentamethylene tetramine), PTSS (p-toluene semicarbazide), BSH (benzene-4-sulfonohydrazide), TSH (toluene-4-sulfonohydrazide), 5-PT (5-phenyltetrazole) and the like are currently used in expandable compositions of this kind, such as rubber vulcanizates (sulfur, peroxide or benzoquinone dioxime) for sealing and bonding cavity sealing systems based on ethylene vinyl acetate, epoxide-based support foams and expandable sealing compounds in automotive construction.

These blowing agents are disadvantageous in that they may cause respiratory sensitization, are generally toxicologically dangerous, or are explosive. Furthermore, the decomposition thereof produces by-products, such as ammonia, formamide, formaldehyde or nitrosamines, which are banned in automotive construction according to the Global Automotive Declarable Substance List (GADSL), IFA-KMR-List 08/2012 or the BGIA report "Index of hazardous substances 2012". In addition, the VOC content (content of volatile organic compounds) is very high when using exothermic blowing agents.

Further, owing to the exothermic decomposition and the narrow temperature range for the decomposition temperature of the above blowing agents, the foam structure is dependent on the hardening/foaming temperatures, which are usually in the range of between 140 and 220° C., and can vary to a very high degree, depending on the temperature range. As a result, the expansion rate and the foam structure fluctuates between the minimum and maximum process temperatures. The foam structure in turn influences the absorption of water at various hardening temperatures, which can be very high even in coarse-pored foams. The aforementioned blowing agents cannot be used effectively at temperatures of below 140° C.

With regard to storage stability, it is very important, particularly for use in the automotive sector, that the expandable compositions can be stored for a relatively long period of time or transported over long distances through different regions and different climate zones, without this being detrimental to the expandability of the compositions. However, known expandable compositions containing both exothermic blowing agents and endothermic blowing agents often do not have optimum storage stability, and this is particularly the case when said compositions are stored at high levels of humidity.

The object of the present invention was therefore to provide thermally expandable compounds which do not need to contain the aforementioned exothermic blowing agents, but which are suitable for the above-described uses in the same way as the known compounds are, and which, above all, have good storage stability.

This object is surprisingly achieved by thermally expandable compositions containing
 a) at least one peroxidically crosslinking polymer,
 b) at least one peroxide,
 c) at least one starch and
 d) at least one endothermic chemical blowing agent.

Corresponding compositions overcome the known drawbacks and, at the same time, meet to a large extent the requirements imposed on thermally expandable compositions of this kind, particularly with regard to excellent expansion and good storage stability.

A first subject of the present invention is therefore thermally expandable compositions containing
 a) at least one peroxidically crosslinking polymer,
 b) at least one peroxide,
 c) at least one polysaccharide and
 d) at least one endothermic chemical blowing agent.

The thermally expandable compositions contain at least one polysaccharide as a component that is essential to the invention. Polysaccharides are understood to be preferably molecules in which at least 10 monosaccharide molecules are interconnected by a glycosidic bond. Preferred examples include cellulose, starch (amylose and amylopectin), pectin, chitin, chitosan, glycogen, callose and derivatives thereof.

At least one cellulose and/or at least one starch, in particular a starch, are particularly preferably contained in the thermally expandable composition.

The use of polysaccharide, in particular cellulose and/or starch, especially starch, has a particularly advantageous effect on storage stability, while at the same time the polysaccharide does not negatively affect expansion behavior, but rather may even improve it. It is therefore possible using polysaccharide, in particular starch, to significantly improve adherence and the degree to which expansion is maintained after storage. This advantageous effect is achieved in particular under storage conditions involving a relative moisture of >70%.

In principle, cellulose derivatives can be used as the celluloses which are preferred according to the invention in all obtainable modifications, molecular weights, branching degrees and substitution patterns. Preferred examples are methyl cellulose, hydroxyethyl cellulose, hydroxyethyl methyl cellulose, hydroxypropyl cellulose, hydroxypropyl methyl cellulose, hydroxypropyl ethyl cellulose, carboxymethyl cellulose and cetyl hydroxyethyl cellulose.

Cellulose in the form of a cellulose powder, such as wood flour, is particularly preferably used. Particularly preferably, the cellulose powders have a particle/fiber size distribution (specified in wt. % in each case) of >30%, in particular >60%, preferably >90%, smaller than 32 μm, and preferably also >70%, in particular >90%, preferably >100%, smaller than 100 μm (sieve residues on Alpine air jet sieve in accordance with DIN EN ISO 8130-1).

The starches preferred within the scope of the invention generally substantially consist of amylose and amylopectin in varying amount ratios. The starches preferably have an amylopectin content of >50 wt. %, in particular >80 wt. %, preferably >95 wt. %, particularly preferably >99 wt. %, based on the total weight of the relevant starch.

The starches can be native, anionically and/or cationically modified, esterified, etherified and/or crosslinked. Native and/or anionic starches are preferred. Starches based on potato starch, maize starch, waxy maize starch, rice starch, wheat starch (in general, cereal starches) or tapioca starch (cassava) are particularly preferred. In testing, particularly good results were achieved for starches based on potato starch, as a result of which starches based on potato starch, in particular native potato starch and/or chemically modified potato starch, such as phosphated hydroxypropyl-modified potato starch, are particularly preferred.

Suitable starches are, in principle, all starches that can be produced from natural resources. Examples of suitable starches are starches from potatoes, tapioca, cassava, rice, wheat or maize. Further examples are starches from arrowroot, sweet potato, rye, barley, millet, oats, sorghum, starches from fruits such as chestnuts, acorns, beans, peas, including pulses, bananas, and plant varieties such as sago palm.

In addition to starches of plant origin, starches that are chemically modified, were obtained by fermentation, are of recombinant origin, or were prepared by biotransformation or biocatalysis can also be used. In the context of the invention, "chemically modified starches" are understood to mean starches of which the properties have been chemically altered such that they are different from the properties that occur naturally. This is achieved substantially by polymer-like reactions in which starch is treated with monofunctional, bifunctional or polyfunctional reagents or oxidizing agents. Preferably, the hydroxy groups of the polyglucans of the starch are transformed by etherification, esterification or selective oxidation, or the modification is based on radical-initiated graft copolymerization of copolymerizable unsaturated monomers onto the starch backbone.

Specific chemically modified starches include, inter alia, starch esters, such as xanthates, acetates, phosphates, sulfates, nitrates, starch ethers, such as nonionic, anionic or cationic starch ethers, oxidized starches, such as dialdehyde starch, carboxy starch, persulfate-degraded starches and similar substances.

Preferred chemical modifications include phosphation, hydroxypropylation, acetylation and ethylation.

In the context of the invention, "starches prepared by biotransformation" indicates that starches, amylose, amylopectin or polyglucans, generally oligomeric saccharides, in particular monosaccharides and disaccharides, are prepared by a biocatalyst (also: enzyme) being used under specific conditions. Examples of starches produced by biocatalytic processes include polyglucan and modified polyglucans, polyfructan and modified polyfructans.

In principle, any anionic or cationic group suitable for modifying starch can be used for the purpose of chemical modification.

Examples of anionic groups are carboxyl groups, phosphate groups, sulfate groups, borate groups, phosphonate groups and sulfonate groups.

Particular preference is given to phosphate, borate and sulfate groups, and among the sulfate groups in particular to those produced by reaction with sulfuric acid. Particular preference is given to phosphate groups.

Examples of cationic groups are tertiary amino groups, quaternary ammonium groups, tertiary phosphine groups, quaternary phosphonium groups, imino groups, sulfide groups and sulfonium groups.

Particular preference is given to amino and ammonium groups.

In the starch molecule, these groups can either be present in free form or as salts thereof. A starch molecule may also be substituted with various anionic or cationic groups which, in addition, may also be introduced by means of various compounds which introduce substituents and by means of various reactions.

Methods and compounds for introducing these groups are familiar and generally known to a person skilled in the art.

In the case of phosphate, sulfate or borate, the corresponding starch derivatives can be obtained by reacting the free inorganic acids, e.g. phosphoric acid or the esters thereof in the case of phosphate.

Carboxyl groups may be introduced, for example, by nucleophilic substitution or by a variant method related to Michael addition. An example of the first type of reaction is the reaction of starch with chloroacetic acid, and an example of the second type of reaction is the addition of maleic acid anhydride to the starch backbone. Mention should also be made, inter alia, to the reaction with hydroxycarboxylic acid in a synthesis similar to Williamson ether synthesis. In this way, it is possible, for example, to use malic acid, citric acid or tartaric acid together with an etherification reaction to attach more than just one carboxyl group at a time to a hydroxyl group of the starch.

It is also possible for compounds which contain, for example, at least two carboxyl groups, such as dicarboxylic acids, etc., to be coupled to the starch backbone by esterifying a carboxyl group with a hydroxyl group.

Cationic starch derivatives can be obtained as follows: For attaching amino functions, use can be made, inter alia, of any derivative chemically activated in such a way that it is made to react by the starch backbone, e.g. by nucleophilic substitution, addition or condensation. Examples for the first type of reaction are trimethylammonium chloride or 2-diethylaminoethyl chloride. The ionic structure is obtained in this case either by direct reaction with the corresponding salt or by subsequent addition of hydrochloric acid. Reactions with epoxide groups in the pendent group of the nitrogen-containing reagent can also be considered here as giving addition products. Examples which may be mentioned are 2,3-(epoxypropyl)diethylammonium chloride or the hydrochloride thereof or 2,3-(epoxypropyl)trimethylammonium chloride. Attachment by condensation results in elimination of condensation products, such as water or methanol or the like, during the reaction between starch and the reagent introducing the ionic groups.

Furthermore, in addition to the anionic or cationic groups, other functional groups may also be present in the starch as substituents.

Examples of these are nonionic substituents, which may, for example, form ether functions or ester functions.

If there are other substituents attached to the starch backbone by means of ether linkages, possibilities include, for example: alkyl, such as methyl, ethyl, propyl and butyl, alkenyl, and hydroxyalkyl, e.g. hydroxyethyl or hydroxypropyl. For attachment by means of ester groups, the main reaction is that with acetic acid anhydride, which produces starch acetate derivatives. Other substituents may be introduced by means of reaction with propionic acid, butyric acid and the higher fatty acids, in particular from naturally occurring metabolism, for example lauric acid, oleic acid, etc. An ether linkage is particularly preferred, in particular with hydroxy alkyl, preferably hydroxypropyl.

Polysaccharides, in particular starches and/or celluloses, preferably starches having a gelation temperature of at least 40° C., preferably at least 50° C. are particularly preferred. In particular, the starches have a gelation temperature of from 40 to 200° C., preferably from 50 to 150° C. Corresponding starches have a positive effect on storage stability, combined with improved expansion.

In particular, it is advantageous to use more than one polysaccharide, preferably more than one starch and/or more than one cellulose, in particular more than one starch. Here, the starches preferably have different gelation temperatures, polysaccharide 1 or starch 1 having a gelation temperature in the range of from 50 to 100° C., and the second polysaccharide 2 or the at least second, preferably modified, starch 2 having a gelation temperature in the range of from 80 to 150° C.

"Gelation" describes the swelling of the polysaccharide. The transition of the polysaccharide or starch at the swelling temperature is taken as a basis for determining the gelation/gelatinization temperature. The gelation temperature can be determined by means of differential scanning calorimetry (DSC) or by means of polarized light microscopy or by observing the swelling as it sets in, preferably by means of DSC.

In various embodiments, the thermally expandable compositions contain the at least one polysaccharide, preferably the at least one starch and/or at least one cellulose, in particular the at least one starch, in an amount of from 0.1 to 20 wt. %, in particular from 0.5 to 15 wt. %, preferably from 1 to 10 wt. %, particularly preferably from 2 to 5 wt. %, based on the total composition. Unless indicated otherwise, the amounts in wt. % given here are based on the total composition prior to expansion.

In particular, commercially available starches and starch derivatives may also be used here, e.g. from Avebe, Cerestar, National Starch, Purac and Südstärke.

In addition to the polysaccharide, the compositions contain endothermic chemical blowing agents. Endothermic chemical blowing agents are advantageous in that they are neither hazardous to health nor explosive, and lower amounts of volatile organic compounds (VOC) are produced during expansion. The decomposition products are substantially $CO_2$ and water. Furthermore, the products produced thereby have a uniform foam structure over the entire process temperature range used for hardening. In the present case, when combined with the other components of the composition, this also results in a particularly low level of water absorption. Finally, the decomposition temperature of the endothermic blowing agents, in particular mixtures thereof, is lower than that of conventional exothermic blowing agents, and the process temperature can therefore be reduced and energy can therefore be saved.

"Endothermic chemical blowing agents" are understood to be compounds according to the invention that decompose upon the action of heat and thereby release gases. In particular, the endothermic chemical blowing agents are selected from bicarbonates, carboxylic acids, in particular solid, optionally functionalized, polycarboxylic acids and salts and mixtures thereof, in particular solid, optionally functionalized, polycarboxylic acids, preferably in combination with urea derivatives.

Suitable bicarbonates (hydrogen carbonates) are those of formula $XHCO_3$, wherein X can be any cation, in particular an alkali metal ion, preferably $Na^+$ or $K^+$, $Na^+$ being extremely preferred. Other suitable cations $X^+$ may be selected from $NH_4^+$, $½Zn^{2+}$, $½Mg^{2+}$, $½Ca^{2+}$ and mixtures thereof. Sodium and/or potassium hydrogen carbonate are particularly preferably used, in particular sodium hydrogen carbonate.

Suitable carboxylic acids are also monocarboxylic acids, such as acetic acid and propionic acid. Solid polycarboxylic acids are, however, particularly preferred. Suitable polycarboxylic acids include, but without being limited thereto, solid, organic di, tri, or tetra acids, in particular hydroxy-functionalized or unsaturated di, tri, tetra or polycarboxylic acids, such as citric acid, tartaric acid, malic acid, fumaric acid and maleic acid. The use of citric acid is particularly preferred. Citric acid is therefore advantageous, inter alia, because it is an ecologically sustainable blowing agent.

In the case of polycarboxylic acids, they can also be partially esterified, at least one free acid group per molecule always being contained therein, however. The polycarboxylic acids are preferably esterified with aliphatic alcohols, such as methanol, ethanol, propanol and butanol. The polycarboxylic acids are preferably not esterified.

The salts of the aforementioned acids and mixtures of two or more of the above-described compounds are also suitable. In salts of the polycarboxylic acids, the counterion is preferably selected from $Na^+$, $K^+$, $½Zn^{2+}$, $½ Mg^{2+}$, $½Ca^{2+}$ and mixtures thereof, $Na^+$ and $K^+$, in particular $Na^+$, being preferred.

When using carboxylic acids, in particular polycarboxylic acids, carbonates can also preferably be used. A mixture of hydrogen carbonates, carbonates and polycarboxylic acids is preferred, as a result of which different activation stages and decomposition reactions can be deliberately set.

Particularly preferred blowing agents are sodium hydrogen carbonate and/or citric acid/citrate; the blowing agent is very particularly preferably a mixture of sodium hydrogen carbonate and citric acid. By comparison with conventional exothermic blowing agents, such as ADCA or OBSH, a mixture of this kind has a much lower start temperature of between just 120 and 140° C., whereas OBSH has a start temperature of between 140 and 160° C. and ADCA has a start temperature of between 160 and 170° C. when activated by zinc salts and even has a start temperature of between 210 and 220° C. in an unactivated state.

Instead of or in combination with carbonates, the carboxylic acids, in particular polycarboxylic acids, can also preferably be combined with urea derivatives. The use of urea derivatives makes it possible for the decomposition temperatures of the carboxylic acids, in particular polycarboxylic acids, to be reduced by up to 40° C. and, at the same time, the decomposition rate can be increased. This makes it possible to obtain foamed compositions which are distinguished by a fine, homogeneous pore structure and which, at the same time, have a very low level of water absorption.

Preferred urea derivatives are those of formula (I)

$$R_1-NH-C(=X)-NR_2R_3 \qquad (I),$$

wherein X represents O or S;
$R_1$, $R_2$ and $R_3$ independently represent H, substituted or unsubstituted alkyl, substituted or unsubstituted heteroalkyl, substituted or unsubstituted cycloalkyl, substituted or unsubstituted aryl or —C(O)—$R_4$, wherein $R_4$ represents H or substituted or unsubstituted alkyl.

"Substituted", as used herein with reference to alkyl or heteroalkyl groups, which $R_1$, $R_2$, $R_3$ and $R_4$ may represent, means that the corresponding group is substituted with one or more substituents selected from the group consisting of —OR', —COOR', —NR'R", —C(=X)NR'R", —NR"C(=X)NR'R", halogen, unsubstituted $C_{6-14}$ aryl, unsubstituted $C_{2-14}$ heteroaryl containing from 1 to 5 heteroatoms selected from O, N and S, unsubstituted $C_{3-10}$ cycloalkyl and unsubstituted $C_{2-10}$ heteroalicyclyl containing from 1 to 5 heteroatoms selected from O, N and S.

"Substituted", as used herein with reference to aryl and cycloalkyl groups, which $R_1$, $R_2$ and $R_3$ may represent, means that the corresponding group can be substituted with one or more substituents selected from the group consisting of —OR', —COOR', —NR'R", —C(=X)NR'R", —NR"C(=X)NR'R", halogen, unsubstituted $C_{1-10}$ alkyl and —$CH_2$ aryl, it being possible for the aryl group in the —$CH_2$ aryl group to in turn be substituted with —OR', —COOR', —NR'R", —C(=X)NR'R", —NR"C(=X)NR'R", halogen and unsubstituted alkyl.

R' and R" are in this case selected, independently of one another, from H, unsubstituted $C_{1-10}$ alkyl, unsubstituted $C_{6-14}$ aryl, unsubstituted $C_{2-14}$ heteroaryl, unsubstituted $C_{3-10}$ cycloalkyl, unsubstituted $C_{2-10}$ heteroalicyclyl, alkylaryl, arylalkyl, heteroarylalkyl and alkylheteroaryl.

"Alkyl", as used herein, refers to linear or branched alkyl groups, such as methyl, ethyl, n-propyl, iso-propyl, n-butyl, n-pentyl, n-hexyl, n-heptyl, n-octyl, n-nonyl, n-decyl, n-undecyl and n-dodecyl, and the linear $C_{14}$, $C_{16}$ and $C_{18}$ alkyl groups. In various embodiments, the alkyl groups are short-chain $C_{1-4}$ alkyl groups, in particular unsubstituted, linear $C_{1-4}$ alkyl functional groups. The alkyl groups can be substituted or unsubstituted, but are preferably unsubstituted. If they are substituted, the substituents are in particular selected from the above-described groups of substituents.

"Heteroalkyl", as used herein, refers to alkyl groups as defined above in which at least one carbon atom is replaced by a heteroatom, in particular N or O, particularly preferably O.

"Aryl", as used herein, refers to aromatic groups that can have at least one aromatic ring, but also a plurality of condensed rings, such as phenyl, naphthyl, anthracenyl and the like. The aryl groups can be substituted or unsubstituted. If they are substituted, the substituents are selected from the above-described groups.

"Heteroaryl", as used herein, refers to aryl groups as defined above in which at least one carbon atom is replaced by a heteroatom, in particular N, S or O, particularly preferably O.

"Halogen", as used herein, refers to fluorine, chlorine, bromine and iodine.

"Cycloalkyl", as used herein, refers to non-aromatic, cyclic hydrocarbons, in particular cyclic alkyl or alkenyl groups as defined above, e.g. cyclopentyl, cyclohexyl and cyclohexenyl groups. If they are substituted, the substituents are selected from the above-described groups.

"Heteroalicyclyl", as used herein, refers to cycloalkyl groups as defined above in which at least one carbon atom is replaced by a heteroatom, in particular N, S or O, particularly preferably O.

In various embodiments of the invention, X represents O.

In various embodiments of the invention, $R_2$ and $R_3$ are selected from H and unsubstituted alkyl groups, in particular $C_{1-4}$ alkyl groups, such as methyl or ethyl. In various embodiments of the invention, $R_2$ and $R_3$ are not H, but rather in particular $C_{1-4}$ alkyl groups. In other embodiments, one of $R_2$ and $R_3$ is H and the other is a $C_{1-4}$ alkyl group.

In various embodiments of the invention, $R_1$ is selected from H and unsubstituted alkyl groups, in particular $C_{1-4}$ alkyl groups, such as methyl or ethyl. In various other embodiments, $R_1$ is selected from substituted or unsubstituted aryl groups, in particular substituted or unsubstituted phenyl groups. If substituted, the phenyl groups are preferably substituted with halogen, —OR', in particular —OH or —O—($C_{1-4}$) alkyl, unsubstituted $C_{1-10}$ alkyl, or $CH_2$ aryl, in particular $CH_2$ phenyl, it being possible for the phenyl functional group to be substituted and, if it is substituted, it is preferably substituted with —NR"C(=X)NR'R". In various embodiments, $R_1$ is selected such that a bisurea derivative of formula (II) is produced

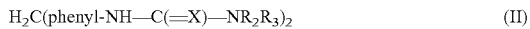

$$H_2C(phenyl-NH-C(=X)-NR_2R_3)_2 \qquad (II)$$

wherein X, $R_2$ and $R_3$ are defined as above. Preferably, in compounds of this kind, all $R_2$ are identical and all $R_3$ are identical.

Example compounds of formula (I) that can be used according to the invention include, but are not limited to: urea (pure urea without any substituents), N,N-dimethyl urea, N,N-diethyl urea, N,N'-dimethyl urea, N,N'-diethyl urea, 4-chlorophenyl-N,N-dimethyl urea, 4,4'-methylene-bis-(phenyldimethyl urea), 1,1-dimethyl-3-(4-chlorophenyl) urea, 1,1-dimethyl-3-(3,4-dichlorophenyl)urea, isophorone bis(dimethyl urea), 1,1-dimethyl-3-phenyl urea, 1,1-dimethyl-3-(4-ethoxyphenyl)urea, 1,1'-(4-phenylene)-bis-(3,3-dimethyl urea), 1,1-dimethyl-3-(2-hydroxyphenyl)urea and 1,1-dimethyl-3-(3-chloro-4-methylphenyl)urea. Urea, N,N-dimethyl urea, N,N-diethyl urea, N,N'-dimethyl urea and N,N'-diethyl urea are particularly preferred.

Particularly preferred blowing agents are mixtures of carboxylic acids, in particular polycarboxylic acids, preferably citric acid/citrate, with the above-described urea derivatives.

The blowing agents can also contain further additives, such as in particular calcium oxide, zeolite, zinc oxide and/or magnesium oxide. Even though carbonates can additionally be used, the blowing agents or the compositions are preferably substantially free of hydrogen carbonates and carbonates. According to the invention, the expression "substantially free of" is understood to mean that the compositions contain less than 1 wt. %, preferably less than 0.1 wt. %, very particularly preferably less than 0.01 wt. %, of the relevant substance, and in particular do not contain the relevant substance at all.

In various embodiments, the thermally expandable compositions contain the blowing agent in an amount of from 0.1 to 40 wt. %, preferably from 1 to 35 wt. %, more preferably from 5 to 35 wt. %, particularly preferably from 10 to 30 wt. %, very particularly preferably from 15 to 25 wt. %, based on the total composition. Unless indicated otherwise, the amounts in wt. % given here are based on the total composition prior to expansion.

In a preferred embodiment, the compositions contain from 1 to 10 wt. %, preferably from 2 to 8 wt. %, of a carbonate, in particular sodium hydrogen carbonate, and from 5 to 35 wt. %, preferably from 10 to 25 wt. %, very preferably from 15 to 22 wt. %, of a carboxylic acid, in particular a polycarboxylic acid, preferably citric acid. Unless indicated otherwise, the amounts in wt. % given here are based on the total composition prior to expansion. Preferably, the ratio of carbonate, in particular sodium hydrogen carbonate, to carboxylic acid, in particular polycarboxylic acid, in particular citric acid, is from 1:1 to 1:20, preferably from 1:2 to 1:10.

In a particularly preferred embodiment, the compositions contain from 0.02 to 6 wt. %, preferably from 0.02 to 2 wt. %, even more preferably from 0.1 to 1.5 wt. %, of the urea derivative of formula (I), and from 5 to 35 wt. %, preferably from 10 to 25 wt. %, very preferably from 15 to 22 wt. %, of the carboxylic acid, in particular the polycarboxylic acid, preferably citric acid. Unless indicated otherwise, the amounts in wt. % given here are based on the total composition prior to expansion. Preferably, the weight ratio of urea derivative to carboxylic acid, in particular polycarboxylic acid, is from 0.1:1 to 0.1:20, preferably from 0.1:2 to 0.1:10.

In a particularly preferred embodiment, the blowing agent is introduced into the thermally expandable composition as a "masterbatch". "Masterbatch" is understood to mean a premixture of the blowing agent to be used, e.g. with a polymer, preferably the used polymer a). In addition to being advantageous in terms of procedure, this technique is also advantageous in that the blowing agent can be distributed in a particularly homogeneous and sparing manner, and the amount of heat produced by the kneading/mixing is thereby reduced. The blowing agent can therefore be prevented from inadvertently decomposing. Particularly preferred is a masterbatch that contains the at least one endothermic blowing agent, preferably the urea derivative and citric acid, and at least a part of the peroxidically crosslinkable polymer a). The masterbatch may also contain the at least one polysaccharide. In addition, the masterbatch may also contain further components, in particular fillers, such as further polymers, talc, dyes and/or antioxidants.

The thermally expandable preparations are preferably substantially free of ADCA (azodicarbonamide) and/or OBSH (4,4'-oxybis(benzenesulfonyl hydrazide)), in particular exothermic blowing agents.

In addition to the endothermic blowing agent, the thermally expandable composition contains at least one peroxidically crosslinkable polymer a) as a binder system.

In principle, all thermoplastic polymers and thermoplastic elastomers that can be peroxidically crosslinked can be used as peroxidically crosslinkable polymers. A person skilled in the art uses the expression "peroxidically crosslinkable" to refer to polymers in which a hydrogen atom can be abstracted from the main chain or a side chain upon action of a radical initiator, such that a radical is left behind that acts on other polymer chains in a second reaction step.

In a preferred embodiment, the at least one peroxidically crosslinkable polymer a) is selected from styrene-butadiene block copolymers, styrene-isoprene block copolymers, ethylene-vinyl acetate copolymers, functionalized ethylene-vinyl acetate copolymers, functionalized ethylene-butyl acrylate copolymers, ethylene-propylene-diene copolymers, ethylene-methyl acrylate copolymers, ethylene-ethyl acrylate copolymers, ethylene-butyl acrylate copolymers, ethylene-(meth)acrylic acid copolymers, ethylene-2-ethylhexyl acrylate copolymers, ethylene-acryl ester copolymers and polyolefins, such as polyethylene or polypropylene.

According to the invention, a "functionalized copolymer" is understood to be a copolymer which is provided with additional hydroxide groups, amine groups, carboxyl groups, anhydride groups and/or acrylate groups.

Within the meaning of the present invention, ethylene-vinyl acetate copolymers, functionalized ethylene-vinyl acetate copolymers, functionalized ethylene-butyl acrylate copolymers, ethylene-propylene-diene copolymers, styrene-butadiene block copolymers, styrene-isoprene block copolymers, ethylene-methyl acrylate copolymers, ethylene-ethyl acrylate copolymers, ethylene-butyl acrylate copolymers and ethylene-(meth)acrylic acid copolymers are particularly advantageous. Very particularly preferred are ethylene-vinyl acetate copolymers and functionalized ethylene-vinyl acetate copolymers, in particular ethylene-vinyl acetate copolymers that do not contain any further monomer units in copolymerized form (pure ethylene-vinyl acetate copolymers).

Thermally expandable preparations which contain at least one ethylene-vinyl acetate copolymer having a vinyl acetate proportion of from 5 to 30 wt. %, in particular from 10 to 25 wt. %, very particularly from 15 to 20 wt. %, based on the total weight of the copolymers, are particularly preferred according to the invention.

Furthermore, it has been found to be advantageous for the thermally expandable preparation to contain a peroxidically crosslinkable polymer a), in particular an ethylene-vinyl acetate copolymer, having a melt flow index of from 0.3 to 400 g/10 min, in particular from 0.5 to 45 g/10 min. Peroxidically crosslinkable polymers a), in particular ethylene-vinyl acetate copolymers, having a melt flow index of from 1.5 to 25 g/10 min, in particular from 2 to 10 g/10 min, very particularly from 2 to 8 g/10 min are particularly advantageous. According to the invention, it can be advantageous for two or more polymers having different melt flow indices to be used in the thermally expandable preparations.

For this purpose, the melt flow index is determined in a capillary rheometer, the polymer being melted at 190° C. in a heatable barrel and being pushed through a defined extruder die (capillary) at a pressure produced by the bearing load (2.16 kg) (ASTM D1238). What is measured is the mass of material that extrudes from the die, as a function of time.

In a preferred embodiment, such as for low-temperature expandable formulations, the polymers a) have a melting point (determinable by means of DSC in accordance with ASTM D3417) that is below the decomposition temperature of the endothermic blowing agent. The polymer a) preferably has a melting point of below 100° C., preferably of between 90 and 60° C.

The thermally expandable preparations preferably contain at least 30 wt. %, in particular at least 50 wt. %, and preferably a maximum of 90 wt. %, in particular a maximum of 85 wt. %, of at least one peroxidically crosslinkable polymer a). Particularly preferred are thermally expandable preparations that contain from 30 to 90 wt. %, in particular from 40 to 85 wt. %, preferably from 50 to 80 wt. %, of at least one peroxidically crosslinkable polymer a), in each case based on the total weight of the thermally expandable preparation.

The thermally expandable preparations preferably contain at least 30 wt. %, and preferably a maximum of 85 wt. %, in particular a maximum of 70 wt. %, of at least one ethylene-vinyl acetate copolymer. Particularly preferred are thermally expandable preparations that contain from 30 to 85 wt. %, in particular from 40 to 75 wt. %, preferably from 50 to 70 wt. %, of at least one ethylene-vinyl acetate copolymer, in each case based on the total weight of the thermally expandable preparation.

In various embodiments, a mixture of at least two polymers is used as polymer a), the first polymer not containing glycidyl (meth)acrylate as a monomer in copolymerized form and preferably being selected from those described above, and the second polymer containing glycidyl (meth) acrylate as a monomer in copolymerized form. The term "(meth)acrylate", as used herein, comprises in each case the corresponding acrylates and methacrylates. In various embodiments, the thermally expandable compositions contain at least one second peroxidically crosslinkable polymer which contains glycidyl (meth)acrylate as a monomer in copolymerized form in a proportion of from 2 to 25 wt. %, based on the relevant polymer. The glycidyl (meth)acrylate proportion on this polymer is preferably from 2 to 20 wt. %, in particular from 3 to 15 wt. %, preferably from 6 to 10 wt. %, based on the total weight of the copolymers. Said polymers preferably contain glycidyl methacrylate. The above-described peroxidically crosslinkable polymers are suitable examples for polymers of this kind, the polymers containing glycidyl (meth)acrylate as a unit. Particularly preferred are terpolymers that preferably contain, in addition to glycidyl (meth)acrylate as a unit, monomers selected from the group of ethylene, propylene, acrylic acid esters, such as preferably methyl (meth)acrylate, ethyl (meth)acrylate, propyl (meth)acrylate or butyl (meth)acrylate, styrene and vinyl acetate. Ethylene/(meth)acrylic acid esters/glycidyl (meth) acrylate terpolymers, in particular ethylene/methyl (meth) acrylate/glycidyl methacrylate and ethylene/butyl (meth) acrylate/glycidyl methacrylate are very particularly preferred. Furthermore, it has been found to be advantageous for the melt flow index of this polymer, in particular the terpolymer, to be from 0.3 to 400 g/10 min, in particular from 0.5 to 45 g/10 min. Polymers, in particular terpolymers, having a melt flow index of from 1.5 to 25 g/10 min, in particular from 2 to 15 g/10 min, are particularly advantageous.

In a preferred embodiment, such as for low-temperature expandable formulations, said polymers, which contain glycidyl (meth)acrylate monomers in copolymerized form, have a melting point (determinable by means of DSC in accordance with ASTM D3417) that is below the decomposition temperature of the endothermic blowing agent. The polymer preferably has a melting point of below 100° C., preferably between 90 and 60° C., preferably between 80 and 65° C.

According to the invention, it can be advantageous for two or more, in particular two, different polymers that contain glycidyl (meth)acrylate monomers in copolymerized form to be used in the thermally expandable preparations. Above all, two different terpolymers are advantageous for improving the low level of water absorption. An ethylene/ methyl (meth)acrylate/glycidyl methacrylate and an ethylene/butyl (meth)acrylate/glycidyl methacrylate are preferably contained.

In embodiments of this kind, the thermally expandable preparations can preferably contain at least 2 wt. %, and preferably a maximum of 40 wt. %, in particular a maximum of 20 wt. %, of at least one polymer which contains glycidyl (meth)acrylate as a monomer in copolymerized form, in particular at least one terpolymer, in a proportion of from 2 to 25 wt. %, in particular from 3 to 20 wt. %, based on the relevant polymer. Particularly preferred are thermally expandable preparations that contain from 2 to 40 wt. %, in particular from 5 to 30 wt. %, preferably from 7.5 to 22.5 wt. %, of at least one peroxidically crosslinkable polymer which contains glycidyl (meth)acrylate as a monomer in copolymerized form, in each case based on the total weight of the thermally expandable preparation. The preparations may also contain at least one ethylene-vinyl acetate copolymer in the above-stated amounts.

In addition to the above-described peroxidically crosslinkable polymers, the thermally expandable preparations may also preferably contain, as further components, at least one low-molecular multifunctional acrylate.

A "low-molecular multifunctional acrylate" is understood to mean a compound which has at least two acrylate groups and a molar weight of below 2400 g/mol, preferably below 800 g/mol. Compounds in particular that have two, three or more acrylate groups per molecule have been found to be advantageous.

Preferred difunctional acrylates are ethylene glycol dimethacrylate, diethylene glycol dimethacrylate, triethylene glycol dimethacrylate, triethylene glycol diacrylate, tripropylene glycol dimethacrylate, 1,4-butandiol dimethacrylate, 1,3 butylene glycol dimethacrylate, 1,3-butanediol dimethacrylate, tricyclodecane dimethanol dimethacrylate, 1,10-dodecanediol dimethacrylate, 1,6-hexanediol dimethacrylate, 2-methyl-1,8-octanediol dimethacrylate, 1,9-nonanediol dimethacrylate, neopentyl glycol dimethacrylate and polybutylene glycol dimethacrylate.

Preferred low-molecular acrylates having three or more acrylate groups are glycerol triacrylate, dipentaerythritol hexaacrylate, pentaerythritol triacrylate (TMM), tetramethylolmethane tetraacrylate (TMMT), trimethylolpropane triacrylate (TMPTA), pentaerythritol trimethacrylate, di(trimethylolpropane) tetraacrylate (TMPA), pentaerythritol tetraacrylate, trimethylolpropane trimethacrylate (TMPTMA), tri(2-acryloxyethyl)isocyanurate and tri(2-methacryloxyethyl)trimellitate and the ethoxylated and propoxylated derivatives thereof having a content of a maximum of 35-EO units and/or a maximum of 20-PO units.

According to the invention, very particularly preferred are thermally expandable preparations that contain a low-molecular multifunctional acrylate selected from triethylene glycol diacrylate, triethylene glycol dimethacrylate, trimethylolpropane triacrylate (TMPTA) and trimethylolpropane trimethacrylate (TMPTMA), pentaerythritol triacrylate (TMM), tetramethylolmethane tetraacrylate (TMMT), pentaerythritol trimethacrylate, di(trimethylolpropane)tetraacrylate (TMPA) and pentaerythritol tetraacrylate.

In addition to the low-molecular acrylates, the thermally expandable preparations may contain further co-crosslinking agents, such as allyl compounds, for example triallyl cyanurate, triallyl isocyanurate, triallyl trimesate, triallyl trimellitate (TATM), tetraallyl pyromellitate, the diallyl esters of 1,1,3-trimethyl-5-carboxy-3-(4-carboxyphenyl)indene, trimethylolpropane trimellitate (TMPTM) or phenylene dimaleimide.

It has been found to be particularly advantageous for the thermally expandable preparations to contain at least one low-molecular multifunctional acrylate selected from triethylene glycol diacrylate, trimethylolpropane triacrylate (TMPTA) and trimethylolpropane trimethacrylate (TMPTMA).

The co-crosslinking agents, preferably the low-molecular multifunctional acrylates, are contained in the thermally expandable preparations preferably in an amount of from 0.2 to 2.5 wt. %, in particular from 0.4 to 1.4 wt. %, in each case based on the total weight of the thermally expandable preparation.

As a hardening system for the peroxidically crosslinkable polymers, the thermally expandable preparations contain at least one peroxide. Particularly preferably, organic peroxides are suitable, for example ketone peroxides, diacyl peroxides, peresters, perketals and hydroperoxides. Particularly preferred are for example cumene hydroperoxide, t-butyl peroxide, bis(tert-butylperoxy)-diisopropylbenzene, di(tert-butylperoxyisopropyl)benzene, dicumyl peroxide, t-butyl peroxybenzoate, dialkyl peroxydicarbonate, diperoxy ketals (e.g. 1,1-di-tert-butylperoxy-3,3,5-trimethylcyclohexane), ketone peroxides (e.g. methyl ethyl ketone peroxides), 4,4-di-tert-butylperoxy-n-butyl-valerate and trioxepane (e.g. 3,3,5,7,7-pentamethyl-1,2,4-trioxepane).

Examples of peroxides commercially marketed by Akzo Nobel and Pergan are particularly preferred, such as 3,3,5,7,7-pentamethyl-1,2,4-trioxepane, 2,5-dimethyl-2,5-di(tert.-butylperoxy)hexane, di-tert.-butyl peroxide, 2,5-dimethyl-2,5-di(tert.-butylperoxy)hexane, tert.-butyl cumyl peroxide, di-(2-tert.-butylperoxyisopropyl)benzene, dicumyl peroxide, butyl-4,4-di(tert.-butylperoxi)valerate, tert-butylperoxy-2-ethylhexyl carbonate, 1,1-di-(tert.-butylperoxy)-3,3,5-trimethylcyclohexane, tert.-butyl peroxybenzoate, di-(4-methylbenzoyl)peroxide and dibenzoyl peroxide.

It has also been found to be advantageous for the peroxides used to be substantially inert at room temperature and to be activated only when heated to relatively high temperatures (for example when heated to temperatures of between 130° C. and 240° C.). It is particularly advantageous for the peroxide used to have a half-life of more than 60 minutes at 65° C., i.e. after the thermally expandable preparation containing the peroxide has been heated to 65° C. for 60 minutes, less than half of the peroxide used has decomposed. According to the invention, peroxides of this kind that have a half-life of at least 60 minutes at 115° C., in particular 130° C., may be particularly preferred.

At least one peroxide selected from the group consisting of di(tert.-butylperoxyisopropyl)benzene, dicumyl peroxide, 1,1-di-(tert.-butylperoxy)-3,3,5-trimethylcyclohexane, 2,5-dimethyl-2,5-di(tert.-butylperoxy)hexane, dibenzoyl peroxide and di-tert.-butyl-1,1,4,4-tetramethylbut-2-in-1,4-ylendiperoxide is particularly preferably contained.

According to the invention, it is also advantageous for at least one peroxide or the peroxides to be used when applied to a solid inert carrier, such as calcium carbonate and/or silica and/or kaolin.

The at least one peroxide or the peroxides is/are contained in the thermally expandable preparations according to the invention preferably in an amount of from 0.05 to 4 wt. %, preferably in an amount of from 0.05 to 2 wt. %, in particular in an amount of from 0.1 to 1 wt. %, the active substance content of peroxide being based in each case on the total weight of the thermally expandable preparation.

In addition to the above-mentioned components, the thermally expandable compounds may contain further conventional components, such as fillers, plasticizers, reactive diluents, rheology auxiliary substances, wetting agents, adhesion promoters, resins, anti-ageing agents, stabilizers and/or dye pigments.

Examples of suitable plasticizers are alkyl esters of dibasic acids (e.g. phthalate esters, adipic acid polyesters), technical white oils and process oils (paraffins), diaryl ethers, benzoates of poly alkylene glycols, citric acid esters (e.g. citric acid triethyl esters), organic phosphates and alkyl sulfonic acid esters of phenol or kresol.

Various ground or precipitated chalks, calcium magnesium carbonate, talc, graphite, barite, silicic acids or silica, and in particular silicate fillers, such as mica, in the form of chlorite for example, or silicate fillers of the aluminum-magnesium-calcium-silicate type, e.g. wollastonite, can be used, for example, as fillers. Talc is a particularly preferred filler. The fillers are preferably coated, advantageously with stearic acid or stearates. This positively influences the flow behavior.

The fillers are preferably used in an amount of from 0 to 60 wt. %, in particular from 0 to 15 wt. %, preferably from 2 to 10 wt. %, particularly preferably from 3 to 8 wt. %, in each case based on the weight of the overall thermally expandable composition.

Color-imparting components, in particular black dyes based on graphite and/or carbon black, are contained in the thermally expandable compositions according to the invention preferably in an amount of from 0 to 2 wt. %, in particular from 0.1 to 0.8 wt. %, very particularly preferably from 0.15 to 0.5 wt. %, in each cased based on the weight of the overall thermally expandable composition.

Sterically hindered phenols or mixtures thereof and/or sterically hindered thioethers and/or sterically hindered aromatic amines, diphosphonites, disulfides can be used, for example, as antioxidants or stabilizers, such as bis-(3,3-bis-(4'-hydroxy-3-tert. butylphenyl)butanic acid) glycol esters or 4-methylphenol, reaction products with dicyclopentadiene and isobutylene.

Antioxidants or stabilizers are contained in the thermally expandable compositions according to the invention preferably in an amount of from 0 to 5 wt. %, in particular from 0.1 to 2 wt. %, preferably from 0.1 to 0.5 wt. %, in each case based on the weight of the overall thermally expandable composition.

Desiccants such as calcium oxide and/or zeolite are contained in the thermally expandable compositions according to the invention preferably in an amount of from 0 to 5 wt. %, in particular from 0.1 to 2.5 wt. %, in each case based on the weight of the overall thermally expandable composition.

A preferred subject of the present invention is thermally expandable compositions containing
  a) from 30 to 90 wt. % of at least one peroxidically crosslinking polymer,
  b) from 0.05 to 4 wt. % of at least one peroxide,
  c) from 0.5 to 15 wt. % of at least one polysaccharide, preferably at least one starch and/or at least one cellulose, in particular at least one starch, and
  d) from 0.1 to 40 wt. % of at least one endothermic chemical blowing agent,
  at least one carboxylic acid, in particular at least one solid, optionally functionalized, polycarboxylic acid or a salt thereof, preferably in an amount of from 5 to 35 wt. %, and additionally at least one carbonate, preferably in an amount of from 1 to 10 wt. %, and/or
  at least one urea derivative of formula (I), preferably in an amount of from 0.02 to 6 wt. %, preferably being contained as the at least one endothermic chemical blowing agent, in each case based on the total weight of the thermally expandable preparation prior to expansion.

Another preferred subject of the present invention is thermally expandable compositions containing
- a) from 30 to 90 wt. %, in particular from 40 to 85 wt. %, preferably from 50 to 80 wt. %, of at least one peroxidically crosslinking polymer,
- b) from 0.05 to 4 wt. %, preferably from 0.05 to 2 wt. %, in particular from 0.1 to 1 wt. %, of at least one peroxide,
- c) from 0.5 to 15 wt. %, preferably from 1 to 10 wt. %, in particular from 2 to 5 wt. %, of at least one polysaccharide, preferably at least one starch and/or at least one cellulose, in particular at least one starch, and
- d) from 0.1 to 40 wt. %, preferably from 1 to 35 wt. %, more preferably from 5 to 35 wt. %, particularly preferably from 10 to 30 wt. %, very particularly preferably from 15 to 25 wt. %, of at least one endothermic chemical blowing agent, the at least one endothermic chemical blowing agent preferably containing at least one carboxylic acid, in particular at least one solid, optionally functionalized, polycarboxylic acid or a salt thereof, preferably in an amount of from 5 to 35 wt. %, more preferably in an amount of from 10 to 25 wt. %, very preferably in an amount of from 15 to 22 wt. %, and at least one urea derivative of formula (I), preferably in an amount of from 0.02 to 6 wt. %, more preferably in an amount of from 0.02 to 2 wt. %, even more preferably in an amount of from 0.1 to 1.5 wt. %, in each case based on the total weight of the thermally expandable preparation prior to expansion.

Another preferred subject of the present invention is thermally expandable compositions containing
- a) from 30 to 85 wt. %, in particular from 40 to 75 wt. %, preferably from 50 to 70 wt. %, of at least one ethylene-vinyl acetate copolymer, and from 2 to 40 wt. %, in particular from 5 to 30 wt. %, preferably from 7.5 to 22.5 wt. %, of at least one peroxidically crosslinkable polymer which contains glycidyl (meth)acrylate as a monomer in copolymerized form,
- b) from 0.05 to 4 wt. %, preferably from 0.05 to 2 wt. %, in particular from 0.1 to 1 wt. %, of at least one peroxide,
- c) from 0.5 to 15 wt. %, preferably from 1 to 10 wt. %, in particular from 2 to 5 wt. %, of at least one polysaccharide, preferably at least one starch and/or at least one cellulose, in particular at least one starch, and
- d) from 0.1 to 40 wt. %, preferably from 1 to 35 wt. %, more preferably from 5 to 35 wt. %, particularly preferably from 10 to 30 wt. %, very particularly preferably from 15 to 25 wt. %, of at least one endothermic chemical blowing agent, the at least one endothermic chemical blowing agent preferably containing at least one carboxylic acid, in particular at least one solid, optionally functionalized, polycarboxylic acid or a salt thereof, preferably in an amount of from 5 to 35 wt. %, more preferably in an amount of from 10 to 25 wt. %, very preferably in an amount of from 15 to 22 wt. %, and at least one urea derivative of formula (I), preferably in an amount of from 0.02 to 6 wt. %, more preferably in an amount of from 0.02 to 2 wt. %, even more preferably in an amount of from 0.1 to 1.5 wt. %, in each case based on the total weight of the thermally expandable preparation prior to expansion.

The thermally expandable compositions according to the invention are preferably formulated such that they are solid at 22° C. According to the invention, a thermally expandable composition is referred to as being "solid" when the geometry of said composition is not deformed under the influence of gravity at the specified temperature within a period of 1 hour, in particular 24 hours.

The thermally expandable compositions according to the invention can be prepared by mixing the selected components in any suitable mixer, for example a kneader, a double Z kneader, a closed mixer, a twin-screw mixer, a continuous mixer or an extruder, in particular a twin-screw extruder.

Although it can be advantageous to heat the components slightly to facilitate achieving a homogeneous and uniform compound, care must be taken to ensure that temperatures which cause the hardener, accelerator and/or blowing agent to be activated are not reached. The resulting thermally expandable composition can be shaped immediately after it has been prepared, for example by blow molding, pelletization, injection molding, compression molding, punching or extrusion.

The thermally expandable composition expands by being heated, the composition being heated for a particular time period and to a particular temperature which is sufficient for activating the blowing agent. Depending on the components of the composition and the requirements of the production line, these temperatures are usually in a range of from 110° C. to 240° C., preferably from 120° C. to 210° C., with a residence time of from 10 to 90 minutes, preferably from 5 to 60 minutes.

In the field of vehicle construction, it is particularly advantageous for the compositions according to the invention to expand when the vehicle passes through the furnace for curing the cathodic dip paint, and therefore a separate heating step can be dispensed with.

The thermally expandable compositions of the present invention can be used in a wide range of support, filling, sealing and adhesive applications, for example in the field of baffle parts for sealing cavities in vehicles. However, use as lining adhesives, for example in doors or roofs, is also conceivable. For an intended purpose of this kind, the thermally expandable compositions according to the invention can be applied by means of direct extrusion. The compositions can, however, also be applied to the application site in an extruded form and pressed and/or fused onto said site. As a third alternative, it is also conceivable for the compositions to be applied as a co-extrudate. In this embodiment, according to the invention, a second adhesive composition is applied in a thin layer under the actual non-adhesive shaped part consisting of the thermally expandable composition according to the invention. In the context of this embodiment, said second adhesive layer is used to fix the shaped part in place in the shell.

The thermally expandable compositions are thus particularly suitable for producing shaped bodies, in particular baffle parts for sealing cavities, i.e. for producing parts which are inserted in the cavities in vehicles, subsequently expanded by being heated and simultaneously cured, so as to thereby seal the cavities as completely as possible.

A second subject of the present invention is thus a shaped body which comprises a thermally expandable composition according to the invention. This may be, for example, a baffle part which is intended for sealing cavities in a component and has a shape that is adapted to the cavity.

According to the invention, "a shape that is adapted to the cavity" is understood to mean all baffle part geometries which ensure that the cavity is completely sealed after the expansion. The shape of the baffle part may be individually adapted to the shape of the cavity and have suitable pointed and/or rounded portions; however, in the case of the thermally expandable compositions according to the invention that have high degrees of expansion, the introduction of a suitably large amount in a variable shape, for example in the shape of a bead or a cut-to-length strand/extrudate of the material, into the cavity may also be sufficient to ensure that the cavity is completely sealed after expansion.

Baffle parts of this type are usually produced from the thermally expandable compositions according to the invention by means of injection molding. In the process, the thermally expandable compositions are heated to temperatures in the range of from 70 to 120° C. and then injected into a correspondingly formed mold.

The shaped bodies according to the invention can be used in all objects that have cavities. These objects include, in addition to vehicles, aircraft, rail vehicles, domestic appliances, furniture, buildings, walls, partitions or boats.

A further subject of the present invention is a method for sealing and filling cavities in components, for strengthening or stiffening components, in particular hollow components, and for bonding movable components, using the thermally compositions and shaped bodies described herein. The method is preferably a method for sealing cavities in a component, a baffle part according to the invention being introduced into the cavity and then heated to a temperature of above 110° C., such that the thermally expandable composition expands and seals the cavity.

A further subject of the present invention is the use of a shaped body or baffle part according to the invention for acoustically sealing cavities in components and/or for sealing cavities in components from water and/or moisture.

Yet another subject of the present invention is the use of a shaped body according to the invention for strengthening or stiffening components, in particular hollow components.

The following examples are intended to explain the invention in more detail, it not being intended for the choice of examples to have a limiting effect on the scope of the subject matter of the invention. Unless specified otherwise, the specified amounts in the compositions are in parts by weight.

PRACTICAL EXAMPLES

General Experimental Procedure/Preparation of the Formulations

In order to prepare the thermally expandable preparations according to the invention, the contained polymers were processed together with fillers at room temperature in a kneader while being heated, if required, up to 150° C., so as to form a homogeneous dough. The further non-reactive components, such as fillers, carbon black, stabilizers and plasticizers, if present, were added one after the other and the formulation was kneaded some more until smooth.

At below 70° C., all reactive components, such as accelerators, peroxides, activators and catalysts, and blowing agents were then added and slowly folded in until the adhesive was homogeneously mixed. The blowing agents were inserted in part as a masterbatch.

Determination of Expansion:

In order to determine the expansion, test pieces having dimensions of approx. 20 mm×20 mm×3 mm were cut from the finished sheets of the example formulations and were introduced into a convection oven, which was heated to the temperatures given in the tables (heating time approx. 7 to 10 min) and the test pieces were then left at this temperature for the period of time given in the tables (including the heating-up time). Expansion at 175° C. corresponds to the ideal conditions which are obtained during curing in vehicle construction. Expansion at 160° C. simulates the underbaking conditions, while expansion at 200° C. simulates the overbaking conditions.

The extent of expansion [%] was determined by means of the water displacement method according to the formula $$\text{Expansion} = \frac{(m2 - m1)}{m1} \times 100$$

m1=mass of the test piece in the original state, in deionized water
m2=mass of the test piece after baking, in deionized water.

Determination of Adherence:

In order to determine adherence, test pieces (produced in the same way as for determining expansion) were heated, on galvanized sheets, for 20 minutes at 160° C. in the convection oven. In order to test the adherence of the foamed shaped body, said shaped body is stored for 24 hours at room temperature after being taken out of the convection oven. The foamed shaped body is then mechanically pulled off the metal surface. The remaining residue of the shaped body on the metal surface is assessed and quantified in terms of the wetted surface (% cf).

The foam structure is visually assessed in each case.

In order to determine storability, the above tests are repeated after storage for 28 days at 40° C. and 80% relative humidity.

By way of illustrating the comparison of the values before and after storage, the absolute difference (Ads·Δ) and the relative retention of the expansion in % are given in the following table for the aforementioned conditions.

In the table below, Comp. Formula 1 is a comparative formulation. Formula 1-7 are formulations according to the invention.

Example Formulation (EVA-Based, Peroxide-Crosslinking)

| Substance name/group (generic name) | Comp. Formula 1 | Formula 1 | Formula 2 | Formula 3 | Formula 4 | Formula 5 | Formula 6 | Formula 7 |
|---|---|---|---|---|---|---|---|---|
| EVA polymer 1 | 60.65 | 68.1 | 68.5 | 69.6 | 64.76 | 69.6 | 61.1 | 70.3 |
| Terpolymer 1 | 10.00 | 10.8 | 10.5 | 10.8 | 10.33 | 10.8 | 16.8 | 10.0 |
| Terpolymer 2 | 2.00 | 3 | 2.5 | 3 | 2.06 | 3 | 3 | 2.0 |
| Citric acid | 17.50 | 13 | 13 | 11.5 | 13.3 | 11.5 | 14 | 13.0 |
| NaHCO$_3$ | 3.50 | — | — | — | 2.6 | — | — | — |
| Talc | 5.25 | — | — | — | 2.35 | — | — | — |
| Peroxide 1 | 0.20 | — | 0.5 | — | 0.2 | — | — | 0.2 |
| Peroxide 2 | 0.60 | — | 0.6 | 1.2 | 0.6 | — | 1.2 | 0.6 |
| Peroxide 3 | — | 1.2 | — | — | — | 1.2 | — | — |

| Substance name/group (generic name) | Comp. Formula 1 | Formula 1 | Formula 2 | Formula 3 | Formula 4 | Formula 5 | Formula 6 | Formula 7 |
|---|---|---|---|---|---|---|---|---|
| Antioxidant | 0.30 | 0.3 | 0.3 | 0.3 | 0.3 | 0.3 | 0.3 | 0.3 |
| Urea | — | 0.6 | 0.6 | 0.6 | — | 0.6 | 0.6 | 0.6 |
| Starch 1 | — | 3 | 3 | — | 3 | — | 1.5 | — |
| Starch 2 | — | — | — | — | — | 3 | 1.5 | — |
| Starch 3 | — | — | — | 3 | — | — | — | — |
| Cellulose | — | — | — | — | — | — | — | 3.0 |
| Carbon black | — | — | 0.5 | — | 0.5 | — | — | — |
| TOTAL | 100 | 100 | 100 | 100 | 100 | 100 | 100 | 100 |
| Expansion | | | | | | | | |
| 20 min, 160° C. | 527 | 551 | 517 | 490 | 462 | 484 | 530 | 561 |
| 25 min, 175° C. | 667 | 652 | 624 | 552 | 543 | 562 | 662 | 649 |
| 40 min, 200° C. | 990 | 770 | 752 | 655 | 715 | 647 | 772 | 733 |
| Adherence | 100% cf | 100% cf | 100% cf | 100% cf | 100% cf | 100% cf | 100% cf | 100% cf |
| Foam structure | fine-pored | fine-pored | fine-pored | fine-pored | fine-pored | fine-pored | fine-pored | fine-pored |
| After storage (28d @ 40° C., 80% RH): Expansion | | | | | | | | |
| 20 min, 160° C. | 301 | 443 | 437 | 420 | 411 | 376 | 391 | 451 |
| 25 min, 175° C. | 384 | 608 | 560 | 482 | 464 | 432 | 486 | 472 |
| 40 min, 200° C. | 412 | 536 | 583 | 503 | 551 | 474 | 537 | 497 |
| Adherence | 80% cf | 100% cf | 100% cf | 100% cf | 100% cf | 100% cf | 100% cf | 100% cf |
| Foam structure | coarse-pored | fine-pored | fine-pored | fine-pored | fine-pored | fine-pored | fine-pored | fine-pored |
| Ads. Δ 20 min, 160° C. | 226 | 108 | 80 | 70 | 51 | 108 | 139 | 110 |
| 40 min, 200° C. | 578 | 234 | 169 | 152 | 164 | 173 | 235 | 236 |
| Relative retention 20 min, 160° C. | 57 | 80 | 85 | 86 | 89 | 78 | 74 | 80 |
| Relative retention 40 min, 200° C. | 42 | 70 | 78 | 77 | 77 | 73 | 70 | 68 |

Components Used:

| | |
|---|---|
| EVA polymer 1 | EVA, 16.5-19.5% VA content, melting point 82-90° C., MFI 1.5-6 g/10 min (190° C., 2.16 kg)) |
| Terpolymer 1 | Terpolymer (GMA/EBA), reactive ethylene terpolymer, 9 wt. % glycidyl methacrylate, 20 wt. % butyl acrylate, melting point 72° C., MFI 8 g/10 min (190° C., 2.16 kg)) |
| Terpolymer 2 | Ethylene-acrylic acid ester- glycidyl methacrylate terpolymer, methylacrylate content 24 wt. %, glycidyl methacrylate content 8 wt. %, melting point 65° C., MFI 6 g/10 min (190° C., 2.16 kg) |
| Citric acid | Particle size 10-15 μm |
| NaHCO$_3$ | Particle size 10-15 μm |
| Talc | Talc |
| Peroxide 1 | Di-(2-tert.-butyl-peroxyisopropyl)benzene, 95% peroxide, 8.98% active substance content, half-life temperature 1 h = 146° C., t90 = 175° C. (rheometer t90 approximately 12 min) |
| Peroxide 2 | 2,5-dimethyl-2,5-di-(tert.-butylperoxy)hexane, 45% peroxide, powder containing chalk, 4.96% active oxygen content, half-life temperature 1 h = 147° C., t90 = 175° C. (rheometer t90 approximately 12 min) |
| Peroxide 3 | Di-tert-butyl-3,3,5-trimethylcyclohexylidene diperoxide, 40% peroxide, powder containing chalk, 4.23% active oxygen content, half-life temperature 1 h = 117° C., t90 = 145° C. (rheometer t90 approximately 12 min) |
| Antioxidant | Bis[3,3-bis-(4'-hydroxy-3'-tert-butylphenyl)butanic acid]-glycol ester, molecular weight 794 g/mol, melting point 167-171° C. |
| Starch 1 | native potato starch, gelation temperature 55° C. |
| Starch 2 | phosphated hydroxypropyl-modified starch based on potato starch, gelation temperature 140° C. |

| | |
|---|---|
| Starch 3 | phosphated hydroxypropyl-modified starch based on potato starch, gelation temperature 65° C. |
| Cellulose | pure white cellulose powder and fibers, cellulose content ~99.5%, loss in drying 5%, sieve residue 32 µm sieve ~5% |
| Carbon black | Monarch 580 |

The tests according to the invention demonstrate that fine foams having good levels of expansion can be obtained by using starch or cellulose, both immediately and after a relatively long period of storage. The results with regard to expansion behavior were able to be significantly improved after storage. The tests further show that the addition of starch makes it possible for adherence to be retained following storage.

What is claimed is:

1. A thermally expandable composition comprising:
   a. at least one peroxidically crosslinked polymer;
   b. at least one peroxide;
   c. at least one polysaccharide; and
   d. at least one endothermic chemical blowing agent;
wherein the composition is free of exothermic blowing agents.

2. The thermally expandable composition according to claim 1, wherein the at least one peroxidically crosslinkable polymer a) is selected from styrene-butadiene block copolymers, styrene-isoprene block copolymers, ethylene-vinyl acetate copolymers, functionalized ethylene-vinyl acetate copolymers, functionalized ethylene-butyl acrylate copolymers, ethylene-propylene-diene copolymers, ethylene-methyl acrylate copolymers, ethylene-ethyl acrylate copolymers, ethylene-butyl acrylate copolymers, ethylene-(meth)acrylic acid copolymers, ethylene-2-ethylhexyl acrylate copolymers, ethylene-acryl ester copolymers and polyolefins.

3. The thermally expandable composition according to claim 2, wherein the at least one peroxidically crosslinked polymer a) is a copolymer selected from ethylene-vinyl acetate copolymers and functionalized ethylene-vinyl acetate copolymers.

4. The thermally expandable composition according to claim 1, wherein the at least one polysaccharide includes a starch and a cellulose.

5. The thermally expandable composition according to claim 1, wherein the at least one polysaccharide comprises more than one starch having a gelation temperature in a range of from 40 to 200 degrees C.

6. The thermally expandable composition according to claim 5, wherein the starch is a native potato starch and/or a chemically modified potato starch.

7. The thermally expandable composition according to claim 1, wherein the at least one endothermic chemical blowing agent contains at least one carboxylic acid or a salt thereof.

8. The thermally expandable composition according to claim 7, wherein the at least one carboxylic acid or a salt thereof comprises at least one solid, optionally functionalized, polycarboxylic acid or a salt thereof.

9. The thermally expandable composition according to claim 7, wherein the at least one carboxylic acid or a salt thereof is selected from solid, organic hydroxy-functionalized or unsaturated di-, tri-, tetra- or poly-carboxylic acids and salts thereof.

10. The thermally expandable composition according to claim 7, wherein the at least one carboxylic acid or a salt thereof is selected from citric acid, tartaric acid, malic acid, fumaric acid, maleic acid and salts thereof.

11. The thermally expandable composition according to claim 7, wherein the blowing agent contains at least one bicarbonate.

12. The thermally expandable composition according to claim 7, wherein the blowing agent contains at least one urea derivative of formula (I):

R1-NH—C(=X)—NR2R3         (I), wherein X represents O or S, R1, R2 and R3 independently represent H, substituted or unsubstituted alkyl, substituted or unsubstituted heteroalkyl, substituted or unsubstituted cycloalkyl, substituted or unsubstituted aryl or —C(O)—R4, wherein R4 represents H, substituted or unsubstituted alkyl.

13. The thermally expandable composition according to claim 12, wherein the urea derivative is selected from: urea, N,N-dimethyl urea, N,N-diethyl urea, N,N'-dimethyl urea, N,N'-diethyl urea, 4-chlorophenyl-N,N-dimethyl urea, 4,4'-methylene-bis-(phenyldimethyl urea), 1,1-dimethyl-3-(4-chlorophenyl)urea, 1,1-dimethyl-3-(3,4-dichlorophenyl)urea, isophorone bis(dimethyl urea), 1,1-dimethyl-3-phenyl urea, 1,1-dimethyl-3-(4-ethoxyphenyl)urea, 1,1'-(4-phenylene)-bis-(3,3-dimethyl urea), 1,1-dimethyl-3-(2-hydroxyphenyl)urea and 1,1-dimethyl-3-(3-chloro-4-methylphenyl)urea.

14. The thermally expandable composition according to claim 13, wherein the urea derivative is selected from: urea, N,N-dimethyl urea, N,N-diethyl urea, N,N'-dimethyl urea and N,N'-diethyl urea.

15. The thermally expandable composition according to claim 12, wherein R1, R2, and R3 independently represent H, substituted or unsubstituted alkyl, substituted or unsubstituted cycloalkyl, substituted or unsubstituted aryl or —C(O)—R4, wherein R4 represents H, substituted or unsubstituted alkyl.

16. The thermally expandable composition according to claim 1, wherein c) the at least one polysaccharide comprises two polysaccharides having different gelation temperatures.

17. A shaped body, wherein the shaped body comprises a thermally expandable composition according to claim 1.

18. A method of sealing and filling cavities in components, of reinforcing or stiffening components, of bonding movable components and combinations thereof comprising steps of:
   1) applying a thermally expandable composition according to claim 1, optionally said thermally expandable composition being a shaped body, to an application site on a component or in a cavity of a component; and
   2) subsequently heating the thermally expandable composition to a selected temperature for a period of time selected such that activation of the blowing agent is thereby induced causing expansion and cure of the thermally expandable composition.

19. The method according to claim 18 wherein the thermally expandable composition is present as the shaped body; step 1) comprises introducing the shaped body into the cavity of the component; and step 2) comprises heating to a temperature greater than 110° C., such that the thermally expandable composition expands and seals, fills, reinforces or stiffens the component.

20. The method according to claim 19 wherein in step 1) the application site is the cavity of the component and wherein the shaped body has a shape that is adapted to the cavity, such that in step 2) the thermally expandable composition expands and seals and/or fills the component thereby acoustically sealing the cavity and/or sealing the cavity from water and/or moisture.

21. A product comprising a component according to the method of claim 18 wherein said product is a vehicle, airplane, rail vehicle, household appliance, furniture, building, wall, partition or boat.

22. A thermally expandable composition comprising:
   a. at least one peroxidically crosslinked polymer;
   b. at least one peroxide;
   c. more than one polysaccharide; and
   d. endothermic chemical blowing agents present in an amount of 15 to 25 wt. % based on total weight of the composition.

23. The thermally expandable composition according to claim 22, wherein c) comprises two polysaccharides having different gelation temperatures; and d) the endothermic chemical blowing agents are selected from the group consisting of bicarbonates, carboxylic acids, urea derivatives and combinations thereof.

24. A thermally expandable composition comprising:
   a. at least one peroxidically crosslinked polymer;
   b. at least one peroxide;
   c. at least one polysaccharide; and
   d. chemical blowing agent consisting essentially of endothermic chemical blowing agents present in an amount of 12.1 to 15.9 wt. % based on total weight of the composition, and said endothermic chemical blowing agents are at least two selected from the group consisting of bicarbonates, carboxylic acids and urea derivatives.

* * * * *